(12) United States Patent
Jovanovic et al.

(10) Patent No.: US 6,775,053 B2
(45) Date of Patent: Aug. 10, 2004

(54) HIGH GAIN PREAMPLIFIER BASED ON OPTICAL PARAMETRIC AMPLIFICATION

(75) Inventors: Igor Jovanovic, Livermore, CA (US); Randal A. Bonner, Waterford, CA (US)

(73) Assignee: The Regents of the University of California, Oakland, CA (US)

(*) Notice: Subject to any disclaimer, the term of this patent is extended or adjusted under 35 U.S.C. 154(b) by 255 days.

(21) Appl. No.: 10/076,720

(22) Filed: Feb. 13, 2002

(65) Prior Publication Data

US 2002/0149836 A1 Oct. 17, 2002

Related U.S. Application Data

(60) Provisional application No. 60/340,127, filed on Dec. 13, 2001, and provisional application No. 60/283,522, filed on Apr. 12, 2001.

(51) Int. Cl.[7] .............................. G02F 1/37; G02F 1/39
(52) U.S. Cl. ...................................... 359/328; 359/330
(58) Field of Search ................................. 359/326–332

(56) References Cited

U.S. PATENT DOCUMENTS

| | | | |
|---|---|---|---|
| 5,047,668 A | 9/1991 | Bosenberg | |
| 5,696,782 A | 12/1997 | Harter et al. | |
| 5,862,287 A | 1/1999 | Stock et al. | |
| 6,181,463 B1 | 1/2001 | Galvanauskas et al. | |
| 6,198,568 B1 | 3/2001 | Galvanauskas et al. | |
| 6,208,458 B1 | 3/2001 | Galvanauskas et al. | |
| 6,282,014 B1 | 8/2001 | Long | |
| 6,320,886 B1 | 11/2001 | Dawber et al. | |
| 6,334,011 B1 | 12/2001 | Galvanauskas et al. | |
| 6,421,166 B1 * | 7/2002 | Velsko et al. ............... | 359/330 |

OTHER PUBLICATIONS

Mark A. Dreger, et al., "Coupled thermal and nonlinear effects for beam propagation in anisotropic crystals," SPIE, vol. 2145, pp. 254–269 (16 pages), 0–8194–1440, Sep. 1994.

John Collier, et al., "Evaluation of an ultrabroadband high-gain amplification technique for chirped pulse amplification facilities," Applied Optics, vol. 38, No. 36, pp. 7486–7493, (8 pages), Dec. 20, 1999.

David Eimerl, "High Average Power Harmonic Generation," IEEE Journal of Quantum Electronics, vol. QE–23, No. 5, pp. 575–592 (18 pages), May 1987.

David Eimerl, "Frequency conversion materials from a device perspective," SPIE vol. 681, Laser and Nolinear Optical Materials, pp. 2–5 (4 pages), 1986.

A. Dubietis, et al., "Powerful femtosecond pulse generation by chirped and stretched pulse parametric amplification in BBO crystal," Optics Communications 88, pp. 437–440 (4 pages), Apr. 1, 1992.

* cited by examiner

*Primary Examiner*—John D. Lee
(74) *Attorney, Agent, or Firm*—Eddie E. Scott; Alan H. Thompson

(57) ABSTRACT

A high-gain preamplifier based on optical parametric amplification. A first nonlinear crystal is operatively connected to a second nonlinear crystal. A first beam relay telescope is operatively connected to a second beam relay telescope, to the first nonlinear crystal, and to the second nonlinear crystal. A first harmonic beamsplitter is operatively connected to a second harmonic beamsplitter, to the first nonlinear crystal, to the second nonlinear crystal, to the first beam relay telescope, and to the second beam relay telescope.

20 Claims, 2 Drawing Sheets

HIGH GAIN PREAMPLIFIER BASED ON OPTICAL PARAMETRIC AMPLIFICATION

CROSS-REFERENCE TO RELATED APPLICATIONS

This application claims the benefit of U.S. Provisional Application No. 60/283,522 filed Apr. 12, 2001 entitled "High Gain Preamplifier Based on Optical Parametric Amplification" and U.S. Provisional Application No. 60/340,127 filed Dec. 13, 2001 entitled "High Gain Preamplifier Based on Optical Parametric Amplification" which are incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to preamplification and more particularly to preamplification based on optical parametric amplification.

2. State of Technology

The article, "Evaluation of an Ultrabroadband High-gain Amplification Technique for Chirped Pulse Amplification Facilities" by John Collier, Cristina Hernandez-Gomez, Ian N. Ross, Pavel Matousek, Colin N. Danson, and John Walczak in *Applied Optics-LP*, Volume 38, Issue 36, 7486–7493, December 1999, provides the following information, "Recently, an amplification technique for ultrashort pulses was explored in detail in a theoretical paper by Ross, et al. Opt. Commun. 144, 125 (1997). The technique, based on nonlinear optics, is called optical parametric chirped pulse amplification. It has a number of features that, in principle, make it highly attractive. It primarily offers extremely large gains simultaneously with extremely large bandwidths. Additional attractions are virtually no spatial and temporal phase distortion of the amplified pulse, high efficiencies and a low thermal loading, reduced amplified spontaneous emission levels, small optical material lengths, and an inherent simplicity of implementation. We present an evaluation of the technique as a front-end amplifier for the ultrashort pulse amplification chain of the Vulcan laser system. Such a device could replace some of the existing amplification in Nd:glass and additionally have a wider effect as a direct replacement of Ti:sapphire regenerative amplifiers on large-scale chirped pulse amplification scale facilities."

U. S. Pat. No. 5,047,668 for optical walkoff compensation in critically phase-matched three-wave frequency conversion systems to Walter R. Bosenberg patented Sep. 10, 1991 describes a walkoff-compensated frequency conversion system such as an optical parametric oscillator includes a pair of nonlinear crystals, such as Beta-Barium Metaborate, aligned in an optical cavity with their optical axes at an angle .THETA. with respect to the axis of the cavity. The crystals are oppositely disposed with respect to the cavity axis so that the angle between their respective optical axes is 2.THETA. In an optical parametric oscillator, the crystals are pumped to produce optical parametric luminescence and frequency conversion, the luminescence being emitted as signal and idler beams. The opposite arrangement of the optical axes of the crystals causes the pumping beam to walk off the signal beam in the first crystal and to walk on the signal beam in the second crystal. Similar walkoff compensation is provided in other frequency conversion systems wherein crystal pairs are oppositely disposed along a cavity optical axis.

U.S. Pat. No. 6,181,463 for quasi-phase-matched parametric chirped pulse amplification systems by Almantas Galvanauskas, et al.; patented Jan. 30, 2001 provides the following information, "Ultrashort pulse lasers and amplifiers belong to a particular class of laser devices which generate ultimately short optical pulses (at the optical-wavelength limit) with durations in the femtosecond (10.sup.-15 s) to picosecond (10.sup.-12 s) regimes. Potential use of such pulses is determined by their characteristic features, which include short duration, high peak power and high spatial and temporal coherence. Diode lasers are compact sources of laser emission which possess two unique technological advantages. First, diode lasers provide direct conversion from electrical to optical power with high efficiency. Second, they are monolithic devices with small dimensions (typically less than 1 mm). Consequently, their parameters such as size, robustness, reliability, life-time, manufacturability and cost are substantially better than corresponding parameters of other laser structures, such as gas, dye or bulk solid-state lasers. These key features make them ideally suitable for developing commercially viable laser sources. However, direct use of diode lasers in the generation of high-energy ultrashort pulses is limited. Essentially this is determined by the small cross-sectional area of a single-mode diode. Catastrophic damage to the diode and severe nonlinear distortions of the ultrashort pulses restricts obtainable peak intensities. Additionally, due to the same small cross-sectional area, stored energy and saturation fluency are also limited. Maximum energies directly obtainable from a laser diode are limited to about 100 pJ, which is at the low limit of practically significant ultrashort pulse energies. While the effective cross-sectional area of a laser diode can be increased by resorting to multiple-transversal-mode structures or multiple-stripe structures, the requirement of spatial and temporal coherence does not permit direct generation of ultrashort pulses with such devices.

This necessitates using diodes as pump sources for other classes of ultrashort-pulse lasers and amplifiers in order to develop practical systems. Rare-earth doped fiber lasers represent one such class of devices and are closest to semiconductor gain media in compactness, as mainly determined by the small transverse dimensions of the fiber. The typical diameter of a fiber structure is less than 1 mm. Unlike a semiconductor laser, a fiber laser can have a length of several meters, but due to the small transverse dimensions it can be spooled to occupy a small space. In effect, the fiber laser is a one dimensional structure, with the transverse distribution of the optical field being the same at any longitudinal position. Rare-earth doped fibers can be diode-laser pumped. For example, known Er-doped fiber laser systems have been pumped with existing high-power laser diodes emitting at 1480 nm or 980 nm.

As reported in Broad-area Diode-pumped 1 W Femtosecond Fiber System, A. Galvanauskas, M. E. Fermann, D. Harter, J. D. Minelly, G. G. Vienne, J. E. Caplen, Conference on Lasers and Electro-Optics, vol. 9 1996 OSA Technical Digest Series (Optical Society of America, Washington, D.C., 1996) pp. 495, hereby incorporated herein by reference, high power multimode diode pump light is efficiently converted into a high power ultrashort pulse output by fiber cladding-pumping techniques and chirped pulse amplification. In general, chirped pulse amplification is necessary for any quantum amplifier in order to extract the maximum available energies without incurring nonlinear distortion of the ultrashort pulses or optical damage to optical components or the gain medium. Typically, the peak intensity of an ultrashort pulse, with an energy equal to the saturation energy, is higher than the saturation fluency of the medium. However, in order to preserve spatial and temporal coherence and to sustain ultrashort pulses, the fiber output has to be single-mode. This puts constraints on the fiber core size and, consequently, on the maximum obtainable pulse energies and peak intensities, for reasons here equivalent to the case of a single-mode semiconductor laser. Maximum obtainable energies for a single-mode fiber, however, are substantially higher than for a semiconductor. The maximum, saturation-fluency-limited energies have already been experimentally produced with some diode pumped Er-fiber chirped pulse amplification systems, yielding pulse energies of more than 10 .mu.j after amplification and recompression. However, for a variety of practical applications, such as micromachining, optical surgery, etc. much higher ultrashort pulse energies are required (typically in the range of 1 to 10 mj).

To obtain these pulse energies, bulk quantum amplifiers have been conventionally used. In a bulk medium, the beam size is substantially larger than the single-mode guided beam in a fiber or a semiconductor structure, alleviating the problem of high peak intensities. Furthermore, certain solid-state gain media have properties which permit design of compact devices. However, a number of limitations, as determined by the general properties of quantum amplifiers, make it practically difficult to implement compact solid-state designs for direct amplification of ultrashort high-energy pulses. This is revealed by considering the general properties of a quantum amplifier.

A quantum amplifier stores pump energy in an upper level of an optical transition state, which can be harvested by a passing signal through the action of optical stimulated emission. Known solid-state ultrashort-pulse amplifying arrangements include single or multiple-pass amplifiers and regenerative amplifiers, and provide pulse energies in the 1 .mu.j to 1 J range. Chirped pulse amplification is a necessity for these systems. However, bulk lasers and amplifiers have notable limitations.

First, solid-state lasers and amplifiers are substantially larger and more expensive than their semiconductor and fiber counterparts. The size and cost are mainly driven by the cumbersome pump sources required, e.g., high-power Ar lasers or lamps. Diode pumping is possible for few such systems. It is necessary to pump a quantum amplifier within the fixed absorption band of the particular gain medium. For many media, this eliminates or restricts diode-laser pumping, because reliable and high-power pump diodes are currently available at only a few wavelengths. For example, the most popular solid-state medium for ultrashort pulse generation is Ti:sapphire, which can not be directly diode laser pumped. Second, quantum amplifiers have a limited gain bandwidth, which is determined by the width of the optical transition in the particular gain medium. The narrow width of the gain bandwidth substantially limits the use of certain materials for amplifying ultrashort pulses. Third, intrinsic properties of the gain medium, such as the lifetime of the excited optical transition and the stimulated emission cross-section, set limits on the maximum extractable average power and pulse energy from a particular quantum amplifier. Fourth, at high power levels, bulk amplifiers are susceptible to thermal effects which change the optical properties of the gain medium. This makes operation of such devices sensitive to changes in the environment.

An alternative approach for achieving optical amplification is to employ optical parametric amplification (OPA) in a nonlinear material. According to the OPA approach, pump energy is not stored in the material but directly transferred from the pump into the signal; the nonlinear material only mediates the process. Pulse distortions through phase distortion can in general be avoided because the second-order nonlinearity is much stronger than the third order (responsible for self or cross-phase modulation). The maximum obtainable energy is essentially limited by the damage threshold of the particular material. The required pump wavelength and the available amplification bandwidth are determined by the fundamental optical properties of the particular crystal, such as orientation and size of the refractive index ellipsoids at the interacting wavelengths in conventional birefringence phase-matching. These fundamental optical properties also determine the useful crystal orientation and, consequently, the magnitude of the nonlinearities which can be utilized. In practice, this puts limitations on the pump wavelengths and bandwidths accessible with the available nonlinear materials and, in general, leads to the high energies required to pump such amplifiers. As a result of the above limitations, parametric interaction at present is generally used as a means of converting the wavelength of an optical signal not as a means of energy amplification.

In Powerful Femtosecond Pulse Generating Chirped and Stretched Pulse Parametric Amplification in BBO Crystals, A. Dubietis, G. Jonusauskas, and A. Piskarskas, Opt. Comm. 88, 437 (1992), hereby incorporated herein by reference, it is suggested that high-energy ultrashort optical pulses may be obtained through the use of optical parametric amplifiers instead of conventional quantum amplifiers. The article teaches that ultrashort optical pulses must be stretched to match the duration of the pump pulse for efficient energy transfer from the pump into the signal. This work demonstrated 1:30 conversion from a 3 mj pump at 0.53 .mu.m into a 100 .mu.J signal at 1.06 .mu.m with short (about 5 ps) stretched pump pulses.

However, the work of Dubietis, et al. does not teach energy conversion from low to high brightness beams, nor how to achieve a compact source of high-energy ultrashort pulses through the use of compact pump sources, such as diode, fiber or microchip lasers. (One of the problems that would be encountered is that to demonstrate the same conversion efficiency with longer pump pulses (in the nanosecond range), pulse energies would have to be increased proportionally by a factor of about 100 (into the Joule range). At present it is difficult to get such high energies from compact pulse sources.) Also, this work does not remove the limitations on the pump wavelength and the gain bandwidth of an ultrashort-pulse amplifier. Additionally, in this work, both the pump and amplified pulses were from the same laser source. No method of synchronizing long-pulse pump and short pulse sources is suggested. It is problematic to synchronize pulses from a conventional Q-switched pump laser with ultrashort pulses from a mode-locked source."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a high-gain preamplifier based on optical parametric amplification. A first nonlinear crystal is operatively connected to a second nonlinear crystal. A first beam relay telescope is operatively connected to a second beam relay telescope, to the first nonlinear crystal, and to the second nonlinear crystal. A first harmonic beamsplitter is operatively connected to a second harmonic beamsplitter, to the first nonlinear crystal, to the second nonlinear crystal, to the first beam relay telescope, and to the second beam relay telescope.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
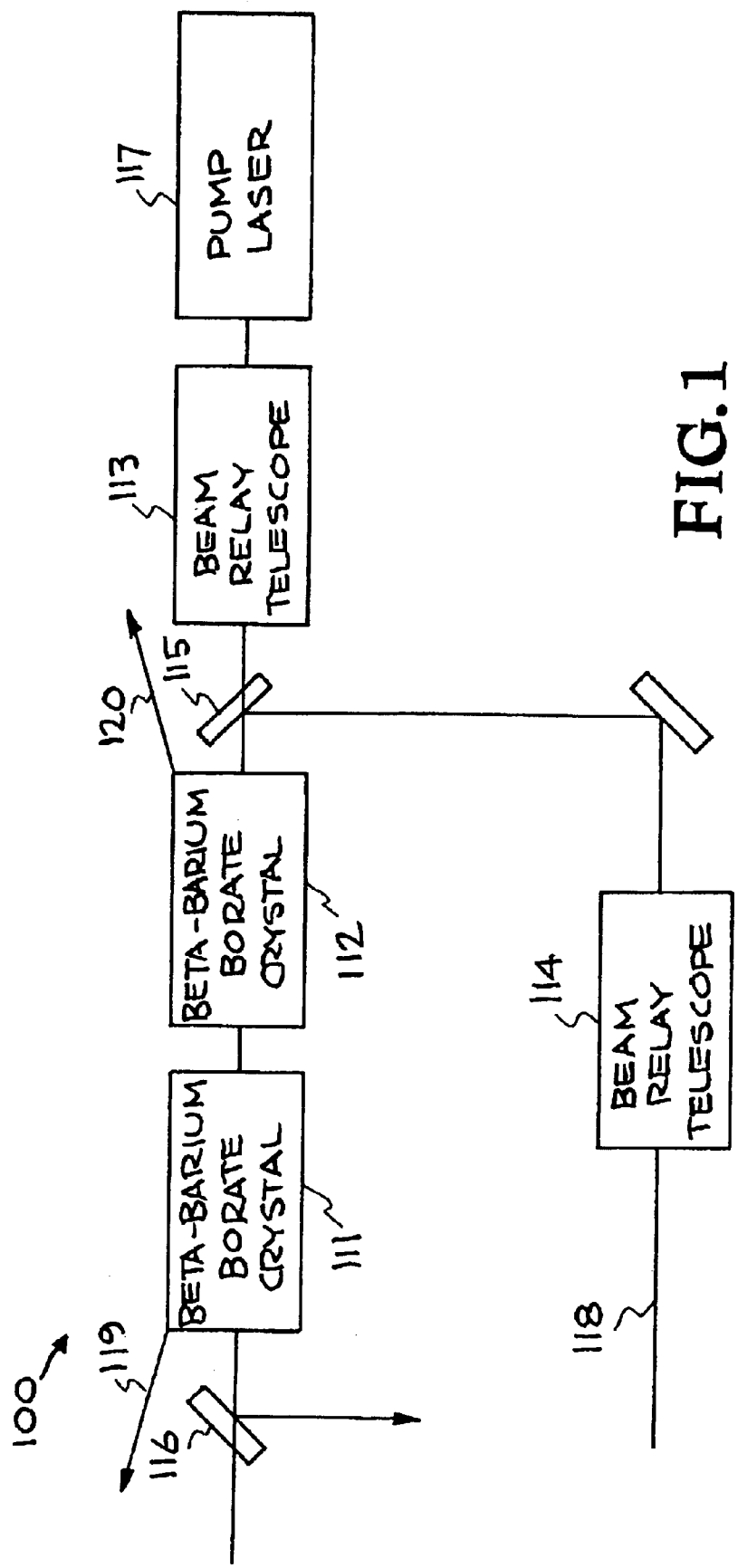
FIG. 1 illustrates a high-gain preamplifier constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1 an embodiment of a high-gain preamplifier based on optical parametric amplification constructed in accordance with the present invention is illustrated. The high-gain preamplifier based on optical parametric amplification is designated generally by the reference numeral 100. Optical parametric amplification is a broadband amplification technology based on a second-order nonlinear process of difference-frequency generation (DFG). When used in chirped pulse amplification (CPA), the technology has been termed optical parametric chirped pulse amplification (OPCPA). The high-gain preamplifier 100 has commercial and other uses that include, but are not limited to, as a front-end amplifier in high peak power laser systems, as a front-end amplifier for optical pulses in applications utilizing high average power chirped pulse amplification such as short pulse materials processing.

Preamplifier 100 includes two beta-barium borate (BBO) crystals 111 and 112, two beam relay telescopes 113 and 114, and two harmonic beamsplitters 115 and 116. Harmonic beamsplitters 115 and 116 are highly reflective for 1054 nm with s-polarization, and highly transmissive for 532 nm wavelength, with p-polarization. The pump beam at 532 nm is relay imaged from the pump laser 117 using telescope 113, and introduced into the amplifier 100 through the harmonic beamsplitter 115 with p-polarization. The seed beam 118 at 1054 nm is imaged from the seed source using telescope 114 and enters the crystals 111 and 112 after reflection from beamsplitter 115, with ordinary polarization. In the embodiment illustrated in FIG. 1, two BBO crystals 111 and 112 are arranged for walk-off compensation. The reduction of the gap between the crystals 111 and 112 minimizes dephasing in air and allows imaging using only a single pair of telescopes 113 and 114. The signal 117 is injected into the preamplifier 100 using beamsplitter 115, and it is separated from the pump beam using beamsplitter 116.

The size of the two BBO crystals 111 and 112 is 4×4×15 mm$^3$, and they are cut for second harmonic generation of 1064 nm ($\theta$=22.8°, ($\phi$=0°). They can be independently angle tuned to achieve angular phase-matching condition. The nonlinear type I difference frequency generation process used in the device is 1054 nm (o)+1074 nm (o)=532 nm (e). The crystals 111 and 112 have 2° wedge on their output faces, which prevents intra-crystal parasitic parametric oscillation. The separation between the crystal faces is 2 mm, which allows independent angular tuning of the crystals, while it simultaneously introduces minimal dephasing due to dispersion in the air. The crystals 111 and 112 are arranged to achieve walk-off compensation. Walk-off of 3.2° occurs due to difference in the direction of the pump beam Poynting vector and pump beam wave vector. In addition to walk-off compensation, the pump and the signal beam are misaligned in the direction of the walk-off on the input face of the first crystal, which assures maximum beam overlap inside the crystals.

The high-gain preamplifier 100 is based on optical parametric amplification. A first nonlinear crystal provides amplification of a signal pulse by transfer of energy from a pump pulse though difference-frequency generation. A second nonlinear crystal provides additional amplification of the signal pulse by transfer of energy from the pump pulse though difference-frequency generation. A first beam relay telescope relays the pump transverse intensity profile, adjusts the pump beam diameter, and collimates the pump beam. A second beam relay telescope relays the seed transverse intensity profile, adjusts the seed beam diameter, and collimates the seed beam. A first harmonic beamsplitter provides collinear coupling of the seed beam with the pump beam into the first nonlinear crystal. A second harmonic beamsplitter separates the amplified' signal and idler beams from the residual pump after amplification in the second nonlinear crystal.

Figure 2:
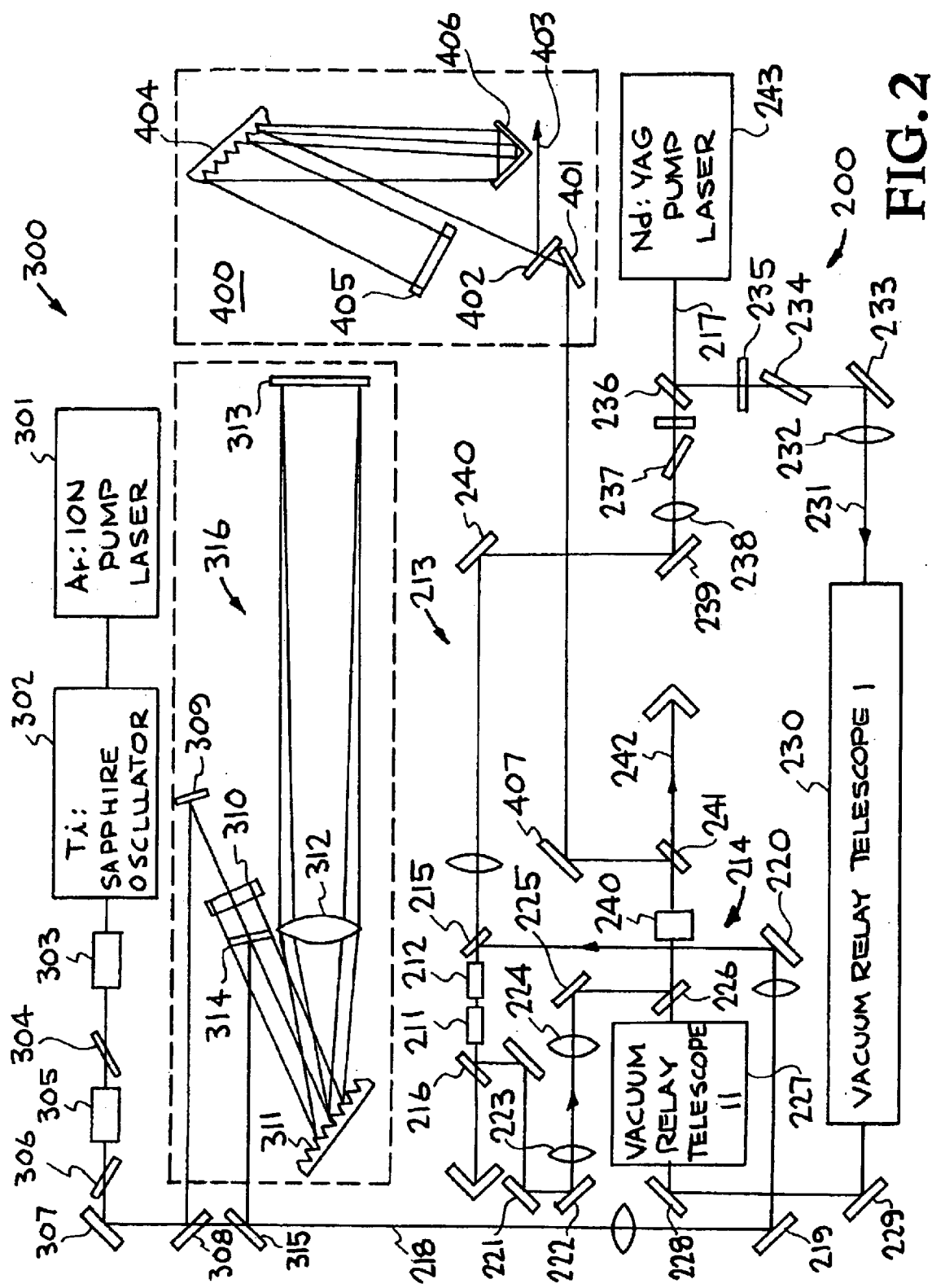
FIG. 2 illustrates the preamplifier as part of a larger system.

Referring now to FIG. 2, another embodiment of a high-gain preamplifier constructed in accordance with the present invention is illustrated and shown as part of a larger system. The preamplifier is designated generally by the reference numeral 200. The larger system is designated generally by the reference numeral 300. The overall system 300 illustrates one example of use of the preamplifier 200. Another example of use of the preamplifier 200 is its use as a part of a larger chirped pulse amplification (CPA) system. Stretched ultrashort laser pulses amplified in the preamplifier 200 are further amplified in a larger power amplifier to 30 mj, and subsequently recompressed in a compressor. Other examples of use of the preamplifier 200 is its use as a part of a larger system such as a front-end amplifier in high peak power laser systems and as a front-end amplifier for optical pulses in applications utilizing high average power chirped pulse amplification such as short pulse materials processing In the example shown in FIG. 2, an experimental OPCPA setup 300 is illustrated for replacing Ti:sapphire regenerative amplifiers. The components include BS-beamsplitter, TFP-thin film polarizer, WP-waveplate, BD-beam dump, FI-Faraday isolator, PC-Pockels cell, and RM-roof mirror. A mode-locked Ti:sapphire oscillator (Spectra-Physics Tsunami) 302 with a center wavelength of 1054 nm produces 100 fs transform-limited pulses. The pulse train consists of 2.5 nJ pulses at 84 MHz. A single pulse is selected from the oscillator pulse train using a Pockels cell 305 and a pair of polarizers 304 and 306. While the pulse selection using Pockels cell 305 improves the pulse contrast, it is not mandatory for system operation. The pulse is stretched in a four-pass stretcher 316 which contains a 1480 lines/mm diffraction grating 311 and a plano-convex lens, with the effective grating separation of 8 m. The stretcher 316 is configured to clip the spectrum at its FWHM, with the bandwidth of 16.5 nm. The stretched pulse width is 3 ns, and the stretched pulse energy is 0.5 nJ. Spherical and chromatic aberrations in the stretcher limit the recompression of the seed pulse to 280 fs prior to amplification.

The stretched seed pulse is then relay imaged to the OPA 200. The OPA 200 consist of three beta-barium borate (BBO) crystals 211, 212, and 240. The size of the first two crystals 211 and 212 is 4×4×15 mm$^3$, while the third crystal 240 is 10×10×10 mm$^3$, permitting scaling to large incident pump pulse energy by increasing the pump beam diameter. The crystals are cut at 22.8 . . . to allow type I angular phase matching, and they have a 2° wedge on their output faces to prevent intra-crystal parasitic oscillation. Without the wedge on the crystals, parasitic oscillation would inevitably manifest itself due to a very large gain in a single OPA crystal. The result would be too stringent requirements on the crystal antireflection coatings.

The pump source for the OPA 200 is a Spectra-Physics GCR 270-10 Nd:YAG laser 243, operated in a single longitudinal mode, producing 600 mj of 532 nm output. The pulse width of Q-switched pulses is 8.5 ns, at a 10 Hz repetition rate. The transverse intensity profile of the pump beam is a supergaussian, while the temporal profile is gaussian, with a characteristic pulse spatiotemporal evolution for an unstable resonator. Spatially resolved temporal evolution of the pump pulse was measured first. For this purpose, the pump laser beam at the OPA crystal was suitably magnified and relay imaged onto a 400 μm pinhole, and a fast silicon diode detector was centered behind the pinhole. Amplitude, pulse width and build-up delay was recorded as a function of radial position of the pinhole. A significant build-up delay and difference in pulse width exists for different radial positions in the pump beam, as a result of pulse build-up in an unstable resonator in the pump laser. While the center of the pump pulse has a slowly variable build-up delay as a function of radial position when compared to the position in the wings of the pump beam, its pulse width is longest at the beam center.

This is a particular difficulty for use in optical parametric amplification, which requires high beam intensities and shorter pulses. Additionally, the problem of Poynting vector walk-off is anticipated to be more critical in OPA pumped by this pulse compared to a pulse which has no radial distribution of build-up delay. This is the result of the instantaneous effective beam size in interaction smaller than the temporally integrated beam size, giving rise to reduced overlap between the signal and the pump beam.

An additional source of dephasing is the beam quality from the pump source. The pump beam quality was measured and found to be 1.6×DL in the sensitive phase matching plane and 1.8×DL in the insensitive phase matching plane. The measured deviation of the pump beam from ideal beam quality has negligible impact on parametric gain with the selected pump beam diameter. The size of the seed beam is dictated by the requirement to avoid spatial modulation on the signal beam due to transverse walk-off of the extraordinary polarized pump beam, and is set to 0.4 mm in the two BBO crystals 111 and 112. The center of the seed beam is displaced from the center of the pump beam by 0.4 mm in the sensitive phase matching direction on the front face of the first BBO crystal, maximizing the spatial overlap of the beams in the preamplifier. The first two crystals are treated as large-gain preamplifiers and the low conversion efficiency resulting from the small spatiotemporal overlap of the seed and the pump pulses is neglected. The seed beam is introduced into the crystal at a 1° external angle with respect to the pump beam, perpendicular to the crystal principal plane. The amplified signal and the idler beam are spatially separated after propagating 30 cm out of the preamplifier, and the idler is subsequently blocked, leaving only the amplified signal.

The supergaussian spatial profile of the pump beam transmitted through the 15% beamsplitter 236 is relay imaged onto the final BBO crystal (power amplifier). The pump imaging telescope consists of two vacuum image relays 213 and 214. The use of two vacuum relay telescopes in the system is necessary because of spatial constraints and the requirement for imaging, beam sizing and temporal matching of the seed and pump between the preamplifier and the power amplifier. The pump beam diameter in the power amplifier is 3.5 mm, with peak intensity of 430 MW/cm$^2$ on the crystal with 410 mj incident pump energy. Operating at an intensity near 0.5 GW/cm$^2$ is a compromise between the requirement for strong nonlinear drive and the reduction of the risk of crystal damage, leading to greater system reliability. At operating intensities near 1 GW/cm$^2$, crystal damage was periodically observed, which is unacceptable in a system with appreciable repetition rate. The signal beam is imaged from the preamplifier and introduced into the power amplifier using the beamsplitter 224. The signal and idler beams are separated spatially after 2 meters of propagation out of the power amplifier crystal, given the larger diameter of the signal and idler beam in the power amplifier.

The amplified signal pulse is compressed using a single-grating, double-pass compressor 400. The compressor 400 contains a 1480 lines/mm grating 404, set at a diffracted angle of 55.33° to match the stretcher angle. No spectral clipping occurs in the compressor 400 as a result of the large size of the associated optics. The spectral range is limited by the hard spectral clip in the stretcher, which limits the size of the spectrally dispersed beam in the compressor. The measured compressor efficiency is 50%, as a result of the degradation of the again surface gold layer. The recompressed pulse width measurement is performed using a scanning intensity autocorrelator for the recompressed seed, and a single-shot intensity autocorrelator for the amplified signal pulse at 10 Hz.

Referring again to FIG. 1, the two BBO crystals 111 and 112 are configured as a high-gain preamplifier 100 and separated by 2 mm. Walk-off compensation is used in order to reduce the effect of the intrinsic 3.2° extraordinary beam Poynting vector walk-off in BBO. The pump beam 117 is split by a 15% beamsplitter 115 into a 90 mj beam and a 510 mj beam. The supergaussian transverse intensity profile of the pump laser is relay imaged between the two BBO crystals 111 and 112 by means of a telescope 113, which simultaneously adjusts the pump beam diameter in the two crystals to 1.6 mm. The proximity of the two walk-off compensated crystals in the preamplifier 100 eliminates the need for separate imaging of the pump beam on each crystal, which is a significant simplification when compared to previous designs. The peak intensity of the pump beam in the first and second BBO crystal is 450 MW/cm². The pump beam is collimated in order to minimize dephasing due to the small angular acceptance of BBO (0.4 mrad cm).

A feature of the embodiment of the present invention 100 is the arrangement of the two amplifier crystals 111 and 112 in close proximity, which offers multiple advantages over previous designs which involved separated crystals. First, relay imaging of the appropriate beam shape from the pump laser is performed between the two crystals 111 and 112, and the desired beam profile is preserved inside both crystals. This eliminates the requirement for reimaging of the pump beam to the second crystal. Second, proper timing between the pump and the signal wave is achieved automatically in the second crystal as a consequence of timing adjusted in the first crystal, eliminating delay lines which typically appear in similar devices. Third, only one pump beam is sufficient for pumping the entire amplifier, increasing its overall conversion efficiency.

Close proximity of the two nonlinear crystals 111 and 112 allows for the relative phases of the waves to be preserved. No separation of the signal and idler beam is required between the two crystals, as the beam path in the air (2 mm) is short to introduce significant relative phase delay for signal, idler and pump waves. It is calculated that a distance of 113 cm in the air would produce a $2\pi$ phase lag for the three waves. The angular and the spectral bandwidth of the entire device are half of the corresponding bandwidths for a single crystal component of the amplifier, but are identical to the bandwidths of a single crystal with the length equal to the length of the entire device. Signal and idler beam are generated at close wavelengths (1054 and 1074 nm), and are angularly separated after propagation through the preamplifier. This is achieved by propagating the seed at a small (0.5°) noncollinear angle with respect to the pump beam in the crystal, perpendicular to the crystal principal plane.

The preamplifier 100 was pumped with 92 mJ pump pulses at 532 nm, with 8.5 ns FWHM pulsewidth, and seeded with a 500 pJ of 1054 nm beam, with 3.1 ns FWHM pulsewidth. The pump spatial profile was supergaussian, while the seed spatial profile was gaussian. The seed beam spectral bandwidth was 16.5 nm. The output of the amplifier was 1.5 mj in the signal beam, indicating total single pass gain of $4 \times 10^6$ using 3 cm of gain material.

The experimental OPCPA setup 300 shown in FIG. 2 produced a 50-fold increase in amplified pulse energy and a 10-fold improvement in efficiency compared to previous systems pumped by tabletop commercial Q-switched pump lasers. The improved efficiency is a result of several factors. Asymmetric splitting of the pump pulse is utilized to obtain a high gain from the preamplifier with small fraction of the pump energy discarded. This is followed by the efficient power amplifier with a large pump beam and a short BBO crystal, resulting in good spatial overlap between the pump and the signal. Walk-off compensated double-crystal preamplifier design allows a relatively small pump beam to be used in the preamplifier. Pump beam is collimated to reduce the angular dephasing in the type I process in BBO. The increased stretched seed pulse width allows a greater fraction of the pump energy to be transferred to signal. The conversion efficiency in the temporal window defined by the stretched seed pulse compares with the result of the OPCPA experiment performed with a large glass laser as a pump.

The wavelength and pulse energy level from the demonstrated OPCPA is ideal for seeding high-energy Nd:glass amplifiers of high-power lasers. The peak power of 50 GW was obtained from a relatively compact and simple setup which does not utilize multipass amplification. The focused intensity from this system is expected to be on the order of $10^{16}$ W/cm². Although this system did not exploit the full bandwidth capabilities of type I nearly degenerate OPAs, high gain, conversion efficiency and amplified pulse fidelity in OPCPA were demonstrated. This gives a viable cause for an all OPA-based kilojoule level ultrashort pulse source.

The present invention provides a method of high-gain preamplifier based on optical parametric amplification. The method includes the following steps. Using a first nonlinear crystal to provide amplification of a signal pulse by transfer of energy from a pump pulse though difference-frequency generation. Using a second nonlinear crystal to provide additional amplification of the signal pulse by transfer of energy from the pump pulse though difference-frequency generation. Using a first beam relay telescope to relay the pump transverse intensity profile, adjust the pump beam diameter, and collimate the pump beam. Using a second beam relay telescope to relay the seed transverse intensity profile, adjust the seed beam diameter, and collimate the seed beam. Using a first harmonic beamsplitter for collinear coupling of the seed beam with the pump beam into the first nonlinear crystal. Using a second harmonic beamsplitter for separating the amplified signal and idler beams from the residual pump after amplification in the second nonlinear crystal.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A high-gain preamplifier based on optical parametric amplification, comprising:
   a first nonlinear crystal;
   a second nonlinear crystal operatively connected to said first nonlinear crystal;
   a first beam relay telescope operatively connected to said first nonlinear crystal and said second nonlinear crystal;
   a second beam relay telescope operatively connected to said first nonlinear crystal, said second nonlinear crystal, and said first beam relay telescope;
   a first harmonic beamsplitter operatively connected to said first nonlinear crystal, said second nonlinear crystal, said first beam relay telescope, and said second beam relay telescope; and
   a second harmonic beamsplitter operatively connected to said first nonlinear crystal, said second nonlinear crystal, said first beam relay telescope, said second beam relay telescope, and said first harmonic beamsplitter.

2. The high-gain preamplifier based on optical parametric amplification of claim 1, wherein said first nonlinear crystal and said second nonlinear crystal are independently angle tuned to achieve an angular phase-matching condition.

3. The high-gain preamplifier based on optical parametric amplification of claim 1, wherein said first nonlinear crystal and said second nonlinear crystal are cut for second harmonic generation of 1064 nm ($\theta=22.80°$, ($\phi=1°$).

4. The high-gain preamplifier based on optical parametric amplification of claim 1, wherein said first nonlinear crystal and said second nonlinear crystal have output faces with a 2° wedge on said output faces.

5. The high-gain preamplifier based on optical parametric amplification of claim 1, wherein said first nonlinear crystal and said second nonlinear crystal are arranged to achieve walk-off compensation.

6. The high-gain preamplifier based on optical parametric amplification of claim 5, wherein said first nonlinear crystal has an input face and said first nonlinear crystal and said second nonlinear crystal are misaligned in the direction of the walk-off on the input face of said first nonlinear crystal.

7. The high-gain preamplifier based on optical parametric amplification of claim 1, wherein the size of said first nonlinear crystal and said second nonlinear crystal is 4×4×15 mm$^3$.

8. The high-gain preamplifier based on optical parametric amplification of claim 1, wherein said first harmonic beamsplitter and said second harmonic beamsplitter are highly reflective for 1054 mm at s-polarization, and highly transmissive for 532 nm wavelength, at p-polarization.

9. The high-gain preamplifier based on optical parametric amplification of claim 1, including a seed beam imaged from a seed source operatively connected to said first nonlinear crystal, said second nonlinear crystal.

10. A high-gain preamplifier based on optical parametric amplification using a seed beam having a transverse intensity profile and a diameter, comprising:
   first nonlinear crystal means for amplification of a signal pulse by transfer of energy from a pump pulse through difference-frequency generation;
   second nonlinear crystal means for additional amplification of said signal pulse by transfer of energy from said pump pulse through difference-frequency generation, operatively connected to said first nonlinear crystal;
   first beam relay telescope means for relay imaging the pump transverse intensity profile, adjusting the pump beam diameter, and collimating the pump beam, operatively connected to said first nonlinear crystal means and said second nonlinear crystal means;
   second beam relay telescope means for relay imaging the seed beam transverse intensity profile, adjusting the seed beam diameter, and collimating the seed beam, operatively connected to said first nonlinear crystal means, said second nonlinear crystal means, and said first beam relay telescope means;
   first harmonic beamsplitter means for nearly collinear coupling of the seed beam with the pump beam into the first nonlinear crystal, operatively connected to said first nonlinear crystal means, said second nonlinear crystal means, said first beam relay telescope means, and said second beam relay telescope means; and
   second harmonic beamsplitter means for separating the amplified signal and idler beams from the residual pump after amplification in the second nonlinear crystal; operatively connected to said first nonlinear crystal means, said second nonlinear crystal means, said first beam relay telescope means, said second beam relay telescope means, and said first harmonic beamsplitter means.

11. A high-gain preamplifier based on optical parametric amplification, comprising:
   a first beta-barium borate (BBO) crystal;
   a second beta-barium borate (BBO) crystal operatively connected to said first beta-barium borate (BBO) crystal;
   a first beam relay telescope operatively connected to said first beta-barium borate (BBO) crystal and said second beta-barium borate (BBO) crystal;
   a second beam relay telescope operatively connected to said first beta-barium borate (BBO) crystal, said second beta-barium borate (BBO) crystal, and said first beam relay telescope;
   a first harmonic beamsplitter operatively connected to said first beta-barium borate (BBO) crystal, said second beta-barium borate (BBO) crystal, said first beam relay telescope, and said second beam relay telescope; and
   a second harmonic beamsplitter operatively connected to said first beta-barium borate (BBO) crystal, said second beta-barium borate (BBO) crystal, said first beam relay telescope, said second beam relay telescope, and said first harmonic beamsplitter.

12. The high-gain preamplifier based on optical parametric amplification of claim 11, wherein said first beta-barium borate (BBO) crystal and said second beta-barium borate (BBO) crystal are independently angle tuned to achieve an angular phase-matching condition.

13. The high-gain preamplifier based on optical parametric amplification of claim 11, wherein said first beta-barium borate (BBO) crystal and said second beta-barium borate (BBO) crystal are cut for second harmonic generation of 1064 mm ($\theta$=22.8°, ($\phi$=0°).

14. The high-gain preamplifier based on optical parametric amplification of claim 11, wherein said first beta-barium borate (BBO) crystal and said second beta-barium borate (13130) crystal have output faces with a 2° wedge on said output faces.

15. The high-gain preamplifier based on optical parametric amplification of claim 11, wherein said first beta-barium borate (BBO) crystal and said second beta-barium borate (BBO) crystal are arranged to achieve walk-off compensation.

16. The high-gain preamplifier based on optical parametric amplification of claim 15, wherein said first beta-barium borate (BBO) crystal has an input face and said first beta-barium borate (BBO) crystal and said second beta-barium borate (BBO) crystal are misaligned in the direction of the walk-off on the input face of said first beta-barium borate (BBO) crystal.

17. The high-gain preamplifier based on optical parametric amplification of claim 11, wherein the size of said first beta-barium borate (BBO) crystal and said second beta-barium borate (BBO) crystal is 4×4×15 mm$^3$.

18. The high-gain preamplifier based on optical parametric amplification of claim 11, wherein said first harmonic beamsplitter and said second harmonic beamsplitter are highly reflective for 1054 nm at s-polarization, and highly transmissive for 532 nm wavelength, at p-polarization.

19. The high-gain preamplifier based on optical parametric amplification of claim 11, including a seed beam imaged from a seed source operatively connected to said first beta-barium borate (BBO) crystal, said second beta-barium borate (BBO) crystal.

20. A method of high-gain preamplification based on optical parametric amplification using a seed beam having a transverse intensity profile and a diameter comprising the steps of:
   using a first nonlinear crystal to provide amplification of a signal pulse by transfer of energy from a pump pulse though difference-frequency generation;
   using a second nonlinear crystal to provide additional amplification of the signal pulse by transfer of energy from the pump pulse though difference-frequency generation;
   using a first beam relay telescope to relay the pump transverse intensity profile, adjust the pump beam diameter, and collimate the pump beam;
   using a second beam relay telescope to relay the seed transverse intensity profile, adjust the seed beam diameter, and collimate the seed beam;
   using a first harmonic beamsplitter for collinear coupling of the seed beam with the pump beam into the first nonlinear crystal; and
   using a second harmonic beamsplitter for separating the amplified signal and idler beams from the residual pump after amplification in the second nonlinear crystal.

* * * * *